United States Patent
Roudbari et al.

(10) Patent No.: US 9,965,063 B2
(45) Date of Patent: May 8, 2018

(54) DISPLAY CIRCUITRY WITH REDUCED PIXEL PARASITIC CAPACITOR COUPLING

(71) Applicant: Apple Inc., Cupertino, CA (US)

(72) Inventors: Abbas Jamshidi Roudbari, Sunnyvale, CA (US); Shih-Chang Chang, Cupertino, CA (US); Ting-Kuo Chang, Cupertino, CA (US); Cheng-Ho Yu, Cupertino, CA (US)

(73) Assignee: Apple Inc., Cupertino ( * ) Notice: Subject to any disclaimer, the term of this patent is extended or adjusted under 35 U.S.C. 154(b) by 441 days.

(21) Appl. No.: 14/174,471

(22) Filed: Feb. 6, 2014

(65) Prior Publication Data

US 2014/0232955 A1 Aug. 21, 2014

Related U.S. Application Data

(60) Provisional application No. 61/767,144, filed on Feb. 20, 2013.

(51) Int. Cl.
   *G06F 3/041* (2006.01)
   *G02F 1/1333* (2006.01)
   *G02F 1/136* (2006.01)
   *G02F 1/1362* (2006.01)

(52) U.S. Cl.
   CPC .......... *G06F 3/041* (2013.01); *G02F 1/13338* (2013.01); *G06F 3/0412* (2013.01); *G06F 3/0416* (2013.01); *G02F 1/13624* (2013.01); *G02F 1/136286* (2013.01); *G02F 2001/13606* (2013.01)

(58) Field of Classification Search
   CPC .................................................. G02F 1/13624
   See application file for complete search history.

(56) References Cited

U.S. PATENT DOCUMENTS

| 7,154,569 | B2 | 12/2006 | Lee et al. |
| 7,456,812 | B2 | 11/2008 | Smith et al. |
| 7,528,808 | B2 | 5/2009 | Tam |
| 8,098,219 | B2 | 1/2012 | Kim |
| 8,217,878 | B2 | 7/2012 | Yamashita et al. |
| 2002/0018035 | A1* | 2/2002 | Song .................... G09G 3/3655 345/87 |
| 2006/0279690 | A1* | 12/2006 | Yu ........................ G02F 1/13338 349/199 |

(Continued)

*Primary Examiner* — Dennis Y Kim
(74) *Attorney, Agent, or Firm* — Treyz Law Group, P.C.; Jason Tsai

(57) ABSTRACT

A touch screen display may have a color filter layer and a thin-film transistor layer. A layer of liquid crystal material may be located between the color filter layer and the thin-film transistor (TFT) layer. The TFT layer may include thin-film transistors formed on top of a glass substrate. Each display pixel in the TFT layer may include first and second TFTs coupled in series between a data line and a storage capacitor. The first TFT may have a gate that is coupled to a gate line. The second TFT may have a gate that is coupled to a control line that is different than the gate line. A global enable signal may be provided on the control line, where the enable signal is asserted during display intervals and is deasserted during touch intervals. The second TFT may be formed using a top-gate TFT or a bottom-gate TFT arrangement.

15 Claims, 15 Drawing Sheets

(56) References Cited

U.S. PATENT DOCUMENTS

| | | | | |
|---|---|---|---|---|
| 2008/0198140 A1* | 8/2008 | Kinoshita | ............ | G06F 3/0412 345/173 |
| 2010/0026921 A1* | 2/2010 | Tsubata | ................ | G09G 3/3648 349/37 |
| 2011/0013105 A1* | 1/2011 | Jung | ................. | G02F 1/136213 349/38 |
| 2011/0266543 A1* | 11/2011 | Moriwaki | ........... | G02F 1/13624 257/59 |
| 2011/0304789 A1* | 12/2011 | Jung | .................. | G02F 1/13624 349/38 |
| 2012/0146043 A1* | 6/2012 | Kitakado | ............ | G02F 1/13624 257/72 |
| 2012/0320004 A1* | 12/2012 | Kitakado | ............ | H01L 27/1214 345/204 |
| 2013/0063400 A1* | 3/2013 | Ahn | ................. | H01L 27/14609 345/175 |

* cited by examiner

DISPLAY CIRCUITRY WITH REDUCED PIXEL PARASITIC CAPACITOR COUPLING

This application claims priority to U.S. provisional patent application No. 61/767,144 filed Feb. 20, 2013, which is hereby incorporated by reference herein in its entirety.

BACKGROUND

This relates generally to electronic devices, and more particularly, to electronic devices with touch screen displays.

Touch screen displays are prevalent in many applications, including consumer electronics devices such as smartphones, tablet devices, and laptop and desktop computers. The display function in such devices is typically performed by a liquid crystal display (LCD), plasma, or organic light emitting diode (OLED) display element array that is connected to a grid of source (data) and gate (select) metal traces. The display element array is often formed on a transparent panel such as a glass panel, which serves as a protective shield. The data and select lines of the display element array may be driven by a display driver integrated circuit (IC). The driver IC receives an image or video signal, which it then decodes into raster scan pixel values (color or gray scale) and writes them to the display element array during each frame, by driving the data and select lines. This process is repeated at a high enough frame rate so as to render video.

The touch gesture detection function in such devices is typically performed using a capacitance sensing subsystem in which a touch transducer grid structure overlays the display element array. The touch transducer structure is stimulated and sensed by touch controller circuitry. A touch stimulus signal is applied to the row segments of the grid, while simultaneously sensing the column segments (to detect a single-touch or a multi-touch gesture). Touch detection is typically performed during a blanking interval portion of the frame, while the display function is performed during a display interval portion of the frame.

The touch transducer grid structure can be implemented as a light transparent electrode plate that covers the display element array and may be formed on a rear surface of the protective panel. In some cases, the transparent electrode plate is also connected to the display elements, serving to deliver a "common voltage" to the display elements from a voltage source circuit often referred to as a Vcom conditioning circuit. The Vcom conditioning circuit helps improve the display function by adjusting a voltage on the transparent conductor plate that changes the light modulation characteristics of the connected display elements (during the display interval). As such, the transparent electrode plate is dual purposed in that it is used for both the display function and as the touch transducer grid structure.

SUMMARY

An electronic device having a liquid crystal display (LCD) is provided. The liquid crystal display may include display pixel circuitry formed on a glass substrate. Thin-film transistor structures may be formed on the glass substrate.

Each display pixel may include a first thin-film transistor (TFT) and a second thin-film transistor coupled in series between a data line and a storage capacitor. The first TFT may have a gate terminal that receives a gate line signal from a gate line, whereas the second TFT may have a gate terminal that receives an enable signal from a control line. The gate line and the control line may be formed in different dielectric layers over the glass substrate. The gate line may be orthogonal to the control line. During data loading operations, the gate line signal may be asserted for a first period of time to turn on the first TFT, and the enable signal may be asserted for a second period of time that is substantially greater than the first period of time to turn on the second TFT (e.g., the second period of time may be at least two times longer than the first period of time, at least ten times longer than the first period of time, at least 100 times longer than the first period of time, at least 1000 times longer than the first period of time, etc.).

In one suitable arrangement, the first transistor is a top-gate TFT, whereas the second transistor is a bottom-gate TFT. In this arrangement, an electrically floating conductive member may be formed over the second TFT. In another suitable arrangement, the first and second transistors are top-gate TFTs. In either arrangement, an electrically floating light shield structure may be formed directly beneath the first TFT to prevent backlight from affecting the operation of the first TFT. If desired, a third transistor having a gate that also receives the gate line signal may be stacked in series with the first transistor to help reduce leakage.

In general, the LCD display includes many display pixels arranged in rows and columns. In some embodiments, the second transistor in each display pixel in a first column of the display pixels may be coupled to the control line via a first active circuit, whereas the second transistor in each display pixel in a second column of the display pixels may be coupled to the control line via a second active circuit. The first and second active circuits may be implemented using inverting circuits or using a first pass transistor that passes a positive power supply voltage and a second pass transistor that passes a ground power supply voltage. If desired, the second transistor in each display pixel in a third column of display pixels may also be coupled to the control line via the first active circuit (e.g., adjacent pixels of the same color may be coupled to the control line via a shared active circuit).

Further features of the present invention, its nature and various advantages will be more apparent from the accompanying drawings and the following detailed description.

DETAILED DESCRIPTION

Displays are widely used in electronic devices. For example, displays may be used in computer monitors, laptop computers, media players, cellular telephones and other handheld devices, tablet computers, televisions, and other equipment. Displays may be based on plasma technology, organic-light-emitting-diode technology, liquid crystal structures, etc. Liquid crystal displays are popular because they can exhibit low power consumption and good image quality. Liquid crystal display structures are sometimes described herein as an example.

Figure 1:
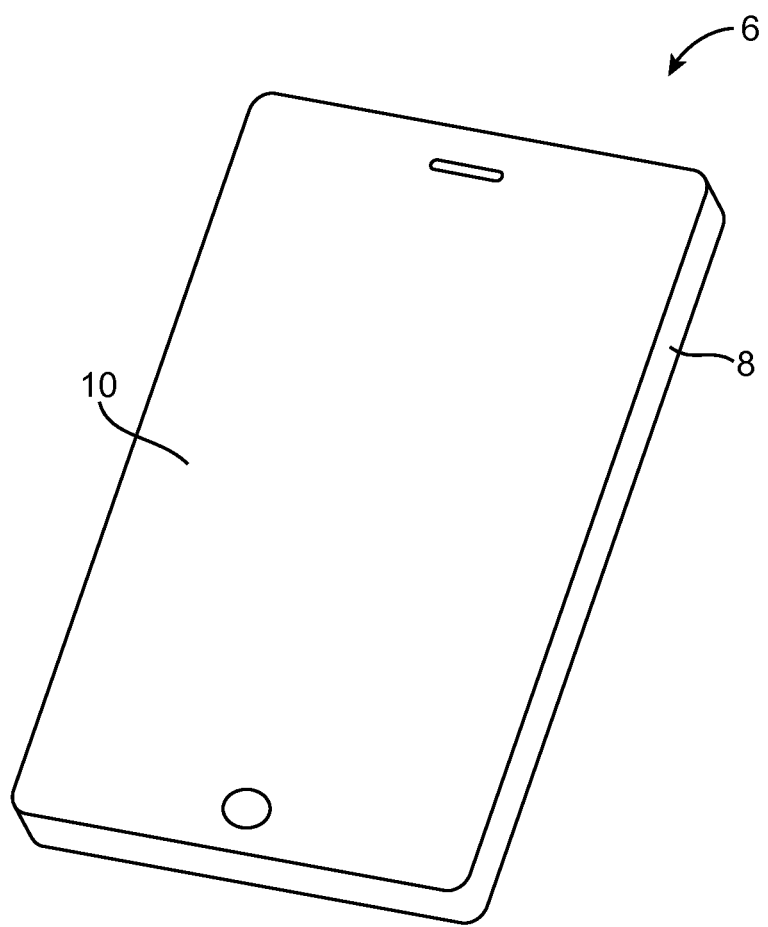
FIG. 1 is a perspective view of an illustrative display such as a liquid crystal display in accordance with an embodiment of the present invention.

A perspective view of an illustrative electronic device with a display is shown in FIG. 1. As shown in FIG. 1, electronic device 6 may have a housing such as housing 8. Housing 8 may be formed from materials such as plastic, glass, ceramic, metal, fiber composites, and combinations of these materials. Housing 8 may have one or more sections. For example, device 6 may be provided with a display housing portion and a base housing portion that are coupled by hinges. In the arrangement of FIG. 1, device 6 has a front face and a rear face. Display 10 of FIG. 1 is mounted on the front face of housing 8. Other configurations may be used if desired.

Display 10 may be a liquid crystal display. A touch sensor array may be incorporated into display 10 (e.g., to form a touch screen display). The touch sensor may be based on acoustic touch technology, force sensor technology, resistive sensor technology, or other suitable types of touch sensor. With one suitable arrangement, the touch sensor portion of display 10 may be formed using a capacitive touch sensor arrangement. With this type of configuration, display 10 may include a touch sensor array that is formed from rows and columns of capacitive touch sensor electrodes.

Figure 2:
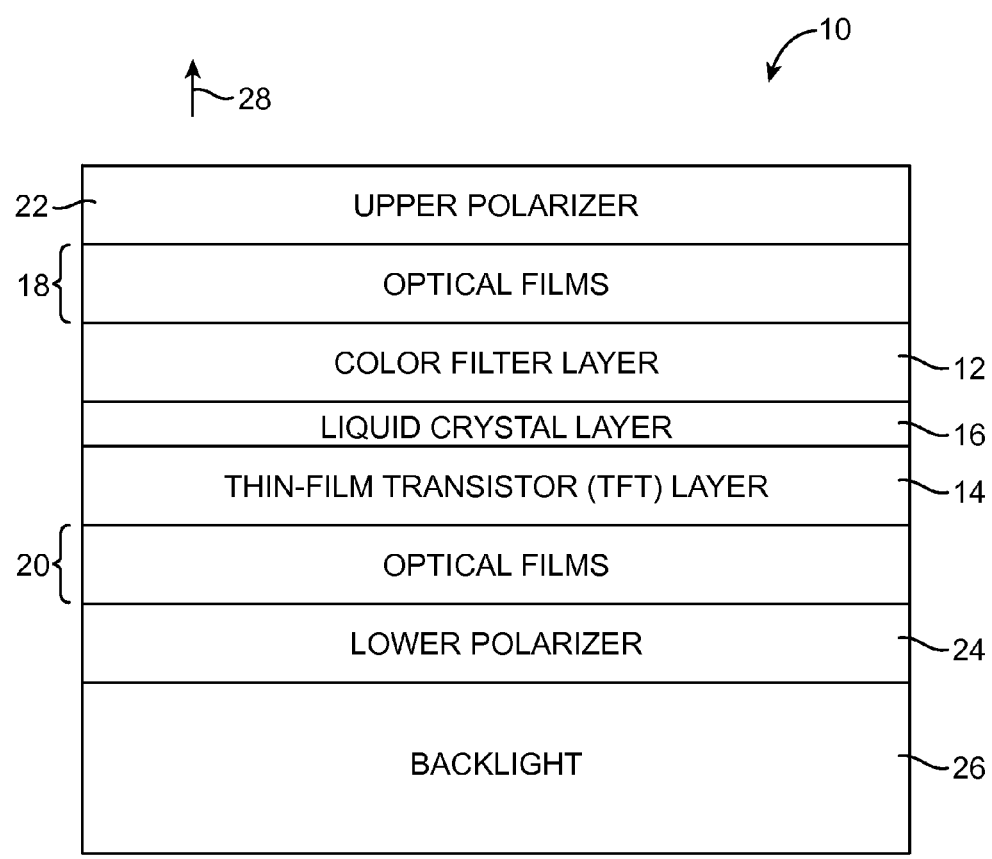
FIG. 2 is cross-sectional side view of an illustrative display in accordance with an embodiment of the present invention.

A cross-sectional side view of a portion of a display of the type that may be used in forming display 10 of FIG. 1 is shown in FIG. 2. As shown in FIG. 2, display 10 may include color filter (CF) layer 12 and thin-film-transistor (TFT) layer 14. Color filter layer 12 may include an array of colored filter elements. In a typical arrangement, the pixels of layer 12 each include three types of colored pixels (e.g., red, green, and blue subpixels). Liquid crystal (LC) layer 16 includes liquid crystal material and is interposed between color filter layer 12 and thin-film-transistor layer 14. Thin-film-transistor layer 14 may include electrical components such as thin film transistors, capacitors, and electrodes for controlling the electric fields that are applied to liquid crystal layer 16. Optical film layers 18 and 20 may be formed above and below color filter layer 12, liquid crystal layer 16, and thin-film-transistor layer 14. Optical films 18 and 20 may include structures such as quarter-wave plates, half-wave plates, diffusing films, optical adhesives, and birefringent compensating layers.

Display 10 may have upper and lower polarizer layers 22 and 24. Backlight 26 may provide backside illumination for display 10. Backlight 26 may include a light source such as a strip of light-emitting diodes. Backlight 26 may also include a light-guide plate and a back reflector. The back reflector may be located on the lower surface of the light-guide panel to prevent light leakage. Light from the light source may be injected into an edge of the light-guide panel and may scatter upwards in direction 28 through display 10. An optional cover layer such as a layer of coverglass may be used to cover and protect the layers of display 10 that are shown in FIG. 2.

Touch sensor structures may be incorporated into one or more of the layers of display 10. In a typical touch sensor configuration, an array of capacitive touch sensor electrodes may be implemented using pads and/or strips of a transparent conductive material such as indium tin oxide. Other touch technologies may be used if desired (e.g., resistive touch, acoustic touch, optical touch, etc.). Indium tin oxide or other transparent conductive materials or non-transparent conductors may also be used in forming signal lines in display 10 (e.g., structures for conveying data, power, control signals, etc.).

In black and white displays, color filter layer 12 can be omitted. In color displays, color filter layer 12 can be used to impart colors to an array of image pixels. Each image pixel may, for example, have three corresponding liquid crystal diode subpixels. Each subpixel may be associated with a separate color filter element in the color filter array. The color filter elements may, for example, include red (R) color filter elements, blue (B) color filter elements, and green (G) color filter elements. These elements may be arranged in rows and columns. For example, color filter elements can be arranged in stripes across the width of display 10 (e.g., in a repeating patterns such as a RBG pattern or BRG pattern) so that the color filter elements in each column are the same (i.e., so that each column contains all red elements, all blue elements, or all green elements). By controlling the amount of light transmission through each subpixel, a desired colored image can be displayed.

The amount of light transmitted through each subpixel can be controlled using display control circuitry and electrodes. Each subpixel may, for example, be provided with a transparent indium tin oxide electrode. The signal on the subpixel electrode, which controls the electric field through an associated portion of the liquid crystal layer and thereby controls the light transmission for the subpixel, may be applied using a thin film transistor. The thin film transistor may receive data signals from data lines and, when turned on by an associated gate line, may apply the data line signals to the electrode that is associated with that thin-film transistor.

Figure 3:
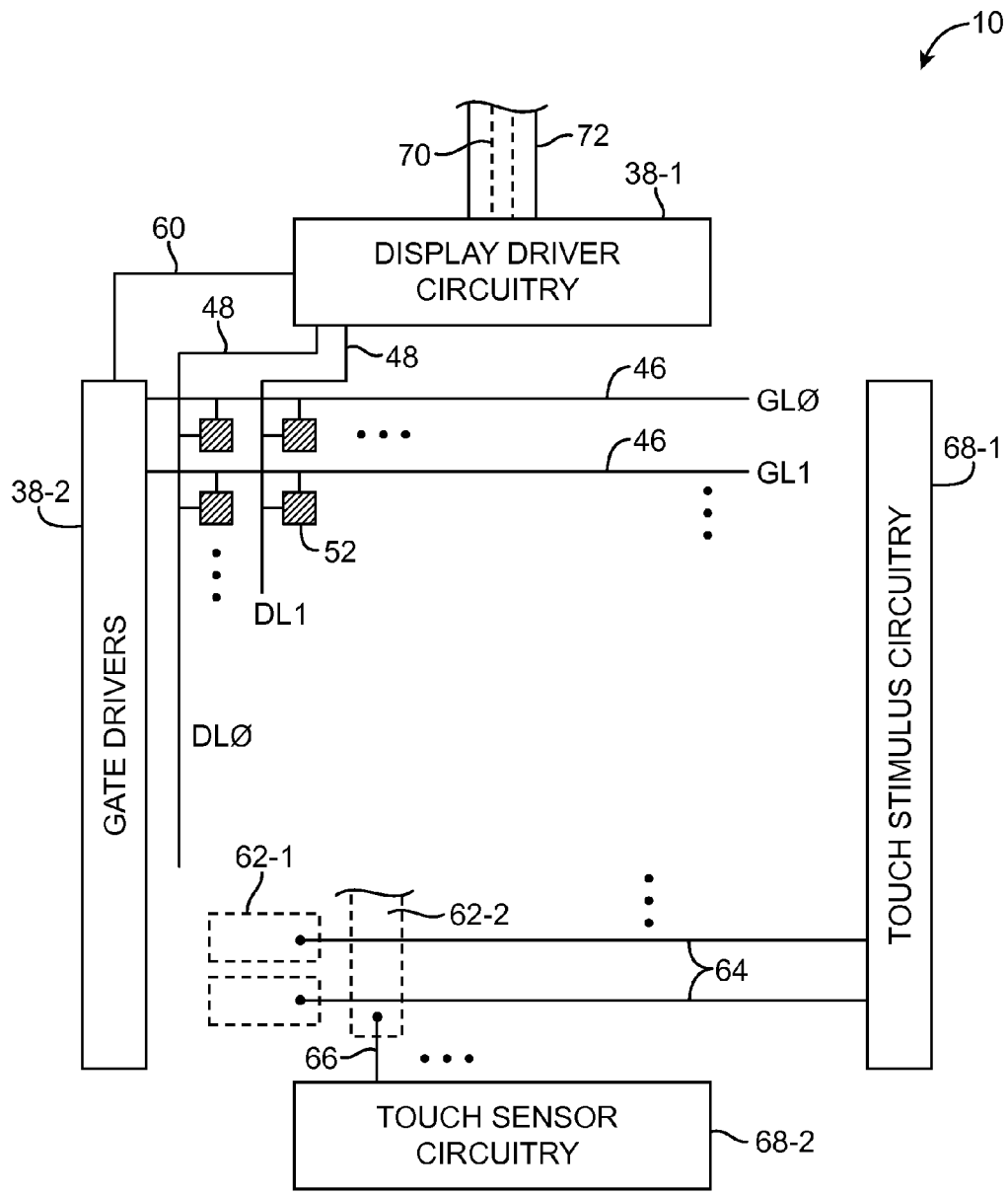
FIG. 3 is an illustrative diagram showing how a display may be provided with image pixel structures and touch sensor elements in accordance with an embodiment of the present invention.

A top view of an illustrative display is shown in FIG. 3. As shown in FIG. 3, display 10 may include an array of image pixels 52. Each image pixel may have an electrode that receives a data line signal from an associated transistor and a common electrode. The common electrodes of display 10 may be formed from a layer of patterned indium tin oxide or other conductive planar structures. The patterned indium tin oxide structure or other conductive structures that are used in forming the common plane for image pixels 52 may also be used in forming capacitive touch sensor elements 62 (e.g., capacitive touch sensor elements 62-1 and 62-2). The touch sensor elements 62 may include rectangular pads of conductive material, vertical and/or horizontal strips of conductive material (e.g., row-wise strips 62-1 and column-wise strips 62-2), and other conductive structures.

For example, row electrodes 62-1 may be driven by touch stimulus circuitry 68-1 that produces an AC waveform on path 64, while associated touch sensor circuitry 68-2 "listens" on corresponding column electrodes 62-2 to detect a capacitance change associated with the region where the row segment 62-1 and the column segment 62-2 intersect one another (e.g., horizontal electrodes 62-1 may be coupled to touch stimulus circuit 68-1 via respective paths 64, whereas vertical electrodes 62-2 may be coupled to touch sensor circuit 68-2 via respective paths 66).

The row and column touch electrodes (sometimes referred to as "segments") that are used in for touch sensing can serve dual purpose in that they can also be used to power the display pixels 52. This is achieved by using electrodes 62-1 and 62-2 to deliver a "common voltage" Vcom to the display elements 52 from a voltage source often referred to as a Vcom conditioning circuit (not shown). The Vcom conditioning circuit can help improve the display performance by adjusting a voltage on the segments 62-1 and 62-2 that changes the light modulation characteristics of each connected display element 52, during a display interval portion of a video frame. Note that the touch function may be performed during a touch interval portion of the video frame, and in particular during a blanking interval (rather than during a display interval) of the video frame.

In a typical arrangement, there are fewer common electrode regions 62 in display 10 than there are image pixels 52, due to the general desire to provide more image resolution than touch sensor resolution. For example, there may be hundreds or thousands of rows and/or columns of pixels 52 in display 10 and only tens or hundreds of rows and/or columns of capacitor electrodes 62.

Display 10 may include display driver circuitry 38-1. Display driver circuitry 38-1 may receive image data from processing circuitry in device 6 via conductive lines 70 in path 72. Path 72 may be, for example, a flex circuit cable or other communications path that couples display driver circuitry 38 to integrated circuits on a printed circuit board elsewhere in device 6 (as an example). Circuitry 38-1 may be implemented using one or more integrated circuits (e.g., one or more display driver integrated circuits). Display driver circuitry 38-1 may control display driver circuitry 38-2 (sometimes referred to as gate line driver circuitry). Gate line driver 38-2 may be incorporated into circuitry 38-1 or may be implemented using thin film transistors on layer 14 (FIG. 2). Paths such as paths 60 may be used to interconnect display driver circuitry 38-1 and 38-2. Display driver circuitries 38-1 and 38-2 may also be implemented using external circuits or other combinations of circuitry, if desired.

The display driver circuitry may control the operation of display 10 using a grid of signal lines such as data lines 48 and gate lines 46. Lines 48 and 46 may form conductive paths for signals that control an array of image subpixels such as subpixels 52 in display 10. Data lines 48 may include lines for addressing pixels of different colors (i.e., pixels associated with color filter elements of different colors). For example, data lines 48 may include blue data lines that carry blue data line signals DL0, red data lines that carry red data line signals DL1, green data lines that carry green data line signals, etc. Signals DL0, DL1, and so on provided by display driver circuitry 38-1 may be analog signals having voltages ranging from −5 volts to 5 volts (as an example).

Digital gate line control signals GL0, GL1, and so on may be generated on respective gate lines 46 by driver circuitry 38-2. Each gate line may be coupled to the gate of an associated one of control transistors in the same row as that gate line. When a row of control transistors is turned on by asserting a given gate line control signal, the control transistors in that row will each route the voltage on their associated data line to their associated electrode subpixel electrode. The voltage difference between each subpixel electrode and the common electrode gives rise to an electric field that is used in controlling the state of the liquid crystal material in a portion of liquid crystal layer 16 (i.e., a portion of layer 16 of FIG. 2).

Figure 4:
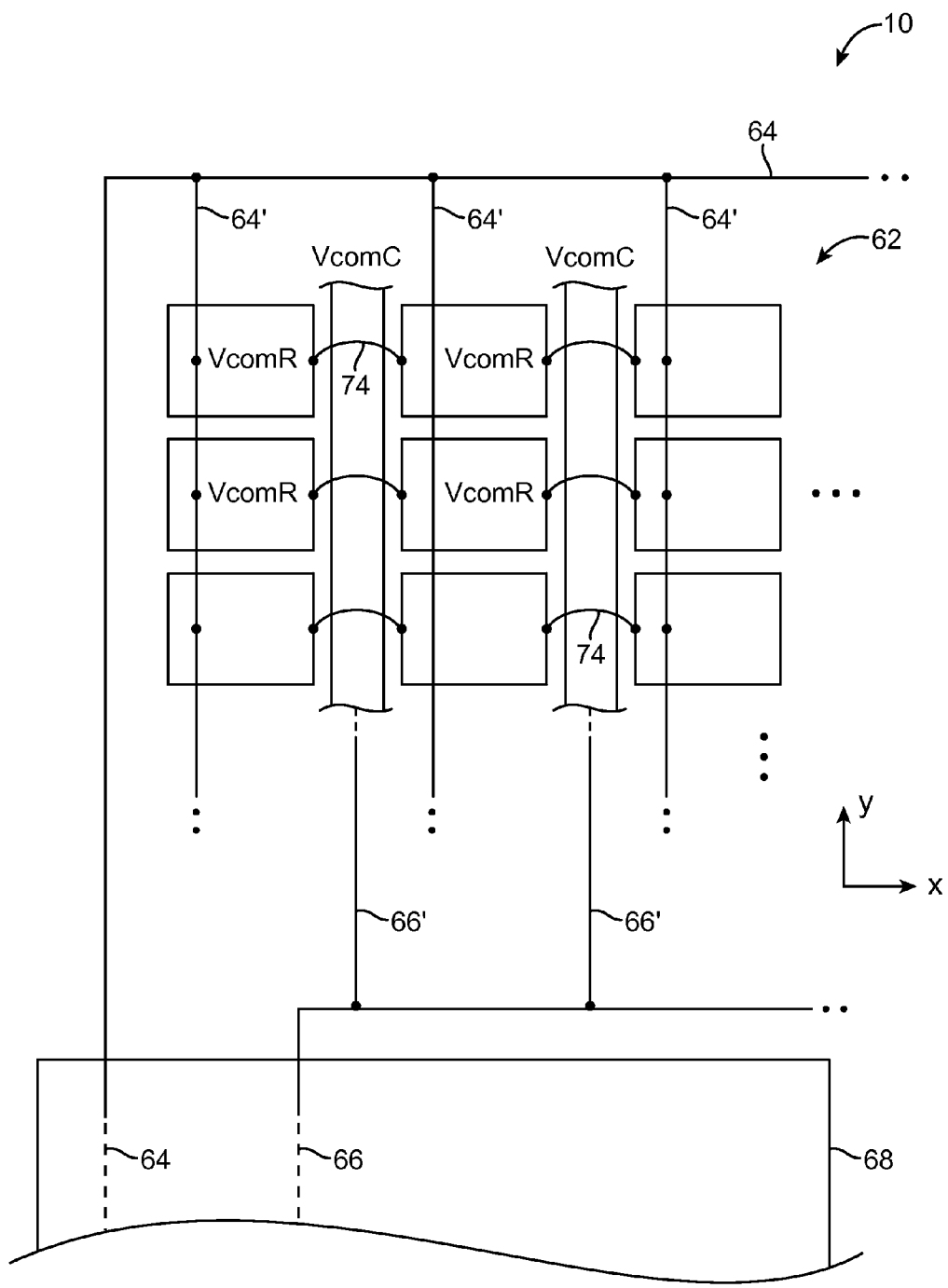
FIG. 4 is a top view of a portion of a display showing how cross-lines may be used in implementing touch functionality in accordance with an embodiment of the present invention.

An illustrative layout that may be used in implementing Vcom paths 62 of FIG. 3 for display 10 is shown in FIG. 4. As shown in FIG. 4, display 10 may include Vcom conductor structures that are interconnected using conductive Vcom paths 64' and 74 to form Vcom rows (called VcomR). Vcom paths 74 may sometimes be referred to as jumpers or cross-lines, because paths 74 electrically couple multiple electrodes across respective Vcom rows without electrically coupling to Vcom column electrodes. Vertical Vcom conductors (called VcomC) may be interconnected using conductive Vcom paths 66'. Paths 64' that are coupled to the VcomR electrodes may be driven by a first driver circuit (e.g., touch stimulus circuit 68-1 of FIG. 3), whereas paths 66' that are coupled to the VcomC electrodes may be driven by a second driver circuit (e.g., touch sensor circuitry 68-2 of FIG. 3). The VcomR and VcomC conductors of FIG. 4 may be formed from indium tin oxide or other transparent conductive material and may be used for supporting both display and touch functions in display 10.

Figure 5:
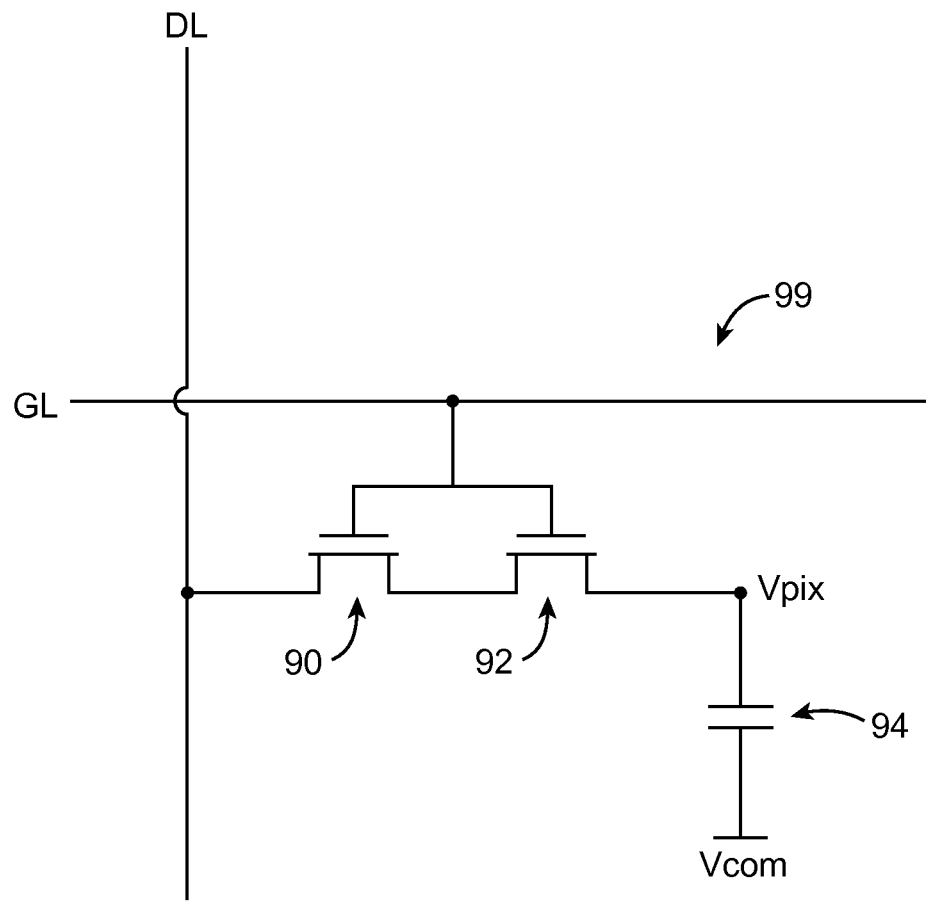
FIG. 5 is a diagram of a conventional display pixel element.

FIG. 5 shows a circuit schematic of a conventional display pixel 99. Display pixel 99 includes a first thin-film transistor (TFT) 90, a second thin-film transistor 92, and a storage capacitor 94. The storage capacitor has a first terminal on which Vpix is stored and a second terminal on which common voltage Vcom is supplied. In particular, transistors 90 and 92 are coupled in series between a data line and the storage capacitor. Transistors 90 and 92 each have a gate terminal that receives a common gate signal GL via an associated gate line (i.e., gate line signal GL is used to turn on or off transistors 90 and 92 simultaneously).

Parasitic capacitance that exists between the gate line, which is coupled to the gate terminal of transistor 92, and the storage node on which Vpix is stored (referred to herein as "Cgp") may degrade touch sensor accuracy. For example, consider a scenario in which a new pixel value is written into storage capacitor 94. This new pixel value may change the value of the parasitic capacitance Cgp (i.e., the value of Cgp may vary as a function of Vpix). Parasitic capacitance Cgp that varies as such is not desirable because Cgp is directly interposed in the touch stimulus and sense path. As a result, when Cgp changes, the touch sensing capability of the display will be affected. It may therefore be desirable to eliminate this parasitic Cgp coupling effect in order to increase touch sensing accuracy.

Figure 6:
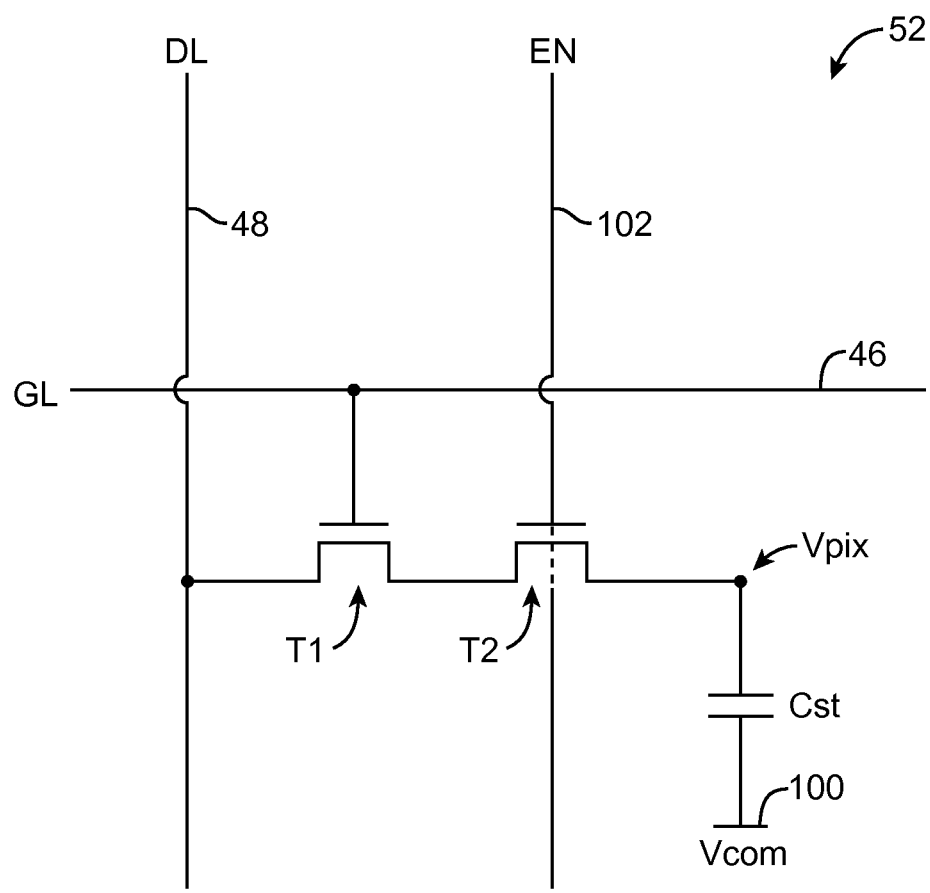
FIG. 6 is a circuit diagram of an illustrative display pixel element having at a decoupling bottom-gate thin-film transistor in accordance with an embodiment of the present invention.

In one suitable embodiment of the present invention, this parasitic coupling between the gate line and the pixel storage node can be reduced by controlling the secondary thin-film transistor via another control line that is different than the gate line (see, e.g., FIG. 6). As shown in FIG. 6, display pixel 52 may include a first thin-film transistor T1, a second thin-film transistor T2, and an associated storage capacitor Cst. Transistor T1 may have a first source-drain terminal that is coupled to data line 48 (e.g., a data line on which a corresponding data signal DL is provided), a second source-drain terminal, and a gate terminal that is coupled to gate line 46 (e.g., a control line on which a corresponding gate control signal GL is provided). Transistor T2 may have a first source-drain terminal that is directly coupled to the second source-drain terminal of transistor T1, a second source-drain terminal that is coupled to capacitor Cst, and a gate terminal that is coupled to an enable line 102 (e.g., a control line on which a global enable signal EN is provided). Capacitor Cst may have a first terminal on which pixel voltage Vpix is stored and a second terminal that is coupled to common electrode 100.

Figure 7:
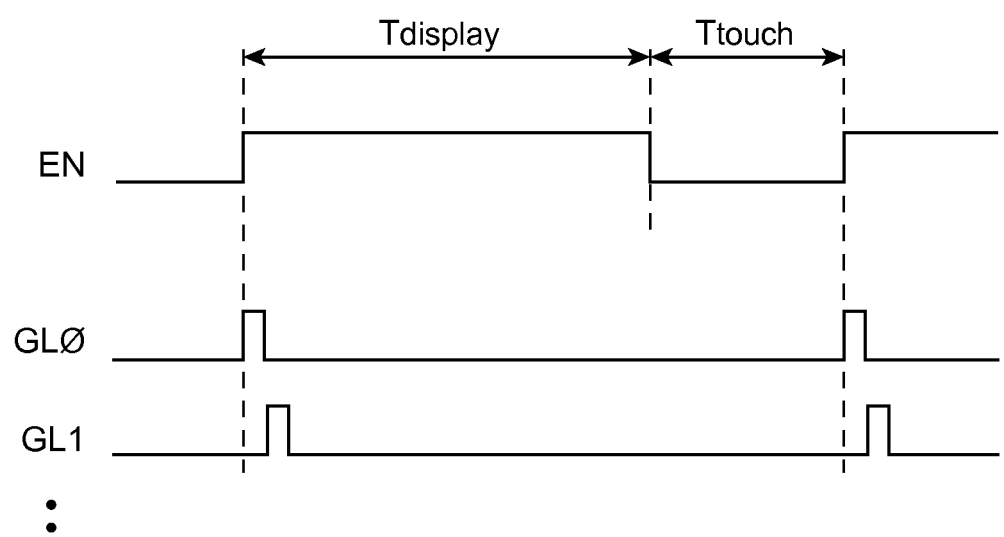
FIG. 7 is a timing diagram showing the behavior of display control signals in accordance with an embodiment of the present invention.

FIG. 7 is a timing diagram showing how display pixel 52 of FIG. 6 can be operated. As shown in FIG. 7, display 10 may operate according to a time division multiplexing scheme in which the operation of display 10 alternates between a display mode (during periods Tdisplay) and a touch sensor mode (during periods Ttouch).

During the display interval, signal EN may be continuously asserted, whereas the gate line signals are sequentially pulsed high to write data signals into each row in the display pixel array. During Tdisplay, both VcomC and VcomR (FIG. 4) may be shorted to a ground voltage such as zero volts or other suitable voltage (e.g., a fixed reference voltage). During the display period, the VcomR and VcomC conductors may work together to serve as a part of a common ground plane (conductive plane) for display 10. Because VcomC and VcomR are shorted together when displaying images in this way, no position-dependent touch data is gathered.

During the touch sensor interval (sometimes referred to as the blanking interval), the image display functions of display 10 may be temporarily paused so that touch data can be gathered. In particular, signal EN may be continuously deasserted during Ttouch. When operating in touch sensor mode, the VcomC and VcomR conductors may be operated independently, so that the position of a touch event can be detected in the dimensions X and Y (see, FIG. 4). There are multiple Vcom rows (VcomR), which allows discrimination of touch position with respect to dimension Y. There are also multiple Vcom columns (VcomC), which allows touch position to be determined in dimension X.

Figure 8:
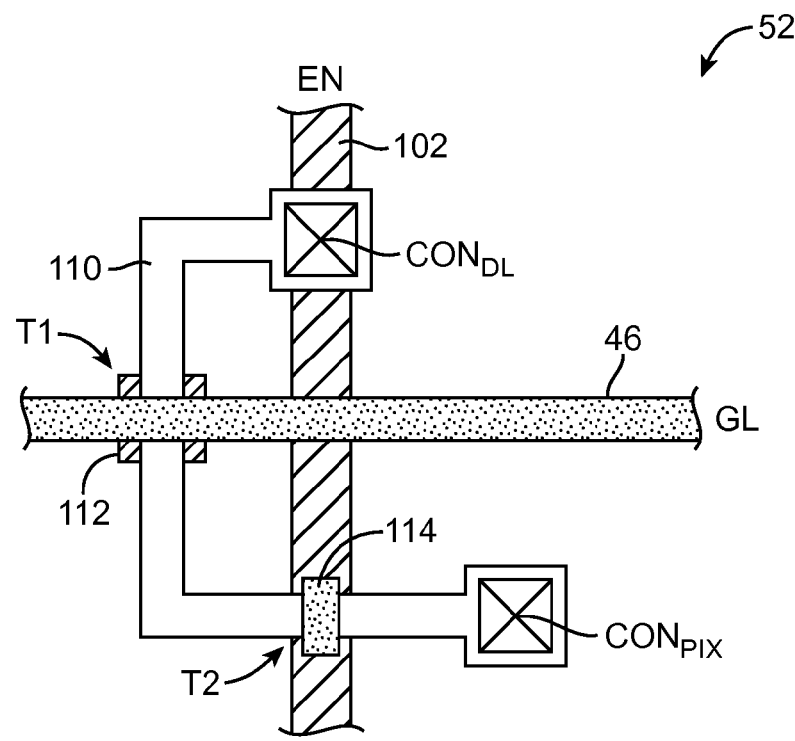
FIG. 8 is a top layout view of the display pixel of FIG. 6 in accordance with an embodiment of the present invention.
Figure 9:
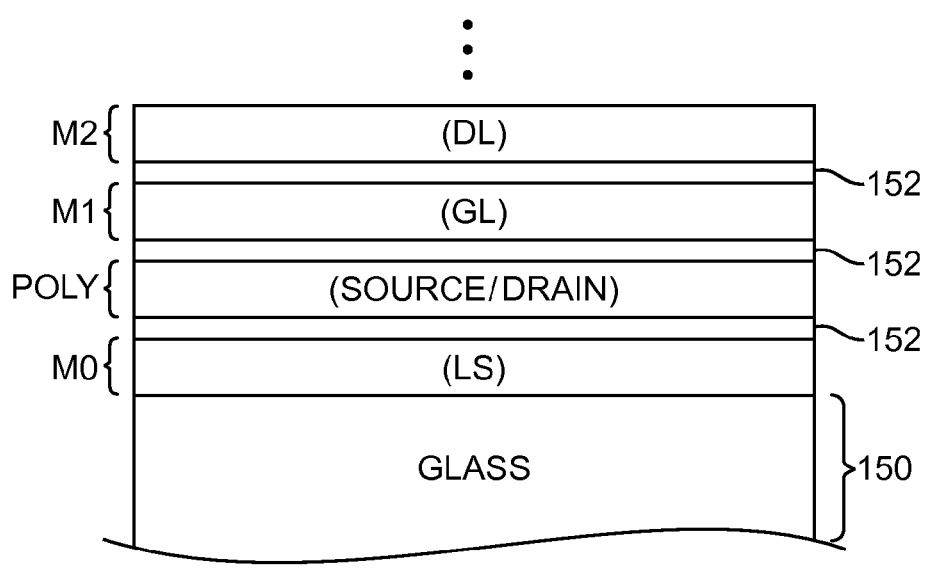
FIG. 9 is a cross-sectional side view showing an illustrative dielectric stack-up arrangement that can be used in forming display pixel structures in accordance with an embodiment of the present invention.

An example layout of such display pixel 52 is shown in FIG. 8. An example stack-up of the dielectric layers that may be used in forming the display pixel structures of FIG. 8 (as well as the others described below) is given in FIG. 9. As shown in FIG. 9, the various dielectric layers may be formed on a transparent substrate such as glass substrate 150. In this example, display element 52 may be an LCD cell that receives a backlight from below a bottom metal routing layer M0 (e.g., a lowermost metal routing layer that is formed directly on glass substrate 150). The term "metal routing layer" may serve to describe a dielectric layer through which metal interconnect routing paths can be formed. Light shielding (LS) structures are sometimes formed in the M0 metal routing layer. Control line 102 on which signal EN is provided may be formed in the M0 metal routing layer. The M0 metal routing layer may therefore sometimes be referred to as a light shield layer, whereas control line 102 may sometimes be referred to as a light shield line.

Referring still to FIG. 9, semiconductor active material such as polysilicon may be formed in layer POLY over the M0 metal routing layer. The polysilicon (or other suitable amorphous silicon) material that is formed in the POLY layer may serve as TFT source-drain diffusion regions. Another metal routing layer M1 may be formed over the POLY layer. TFT gate conductors and associated gate line routing paths may be formed in the M1 metal routing layer. Another metal routing layer M2 may be formed over the M1 metal routing layer. Data line routing paths may be formed in the M2 metal routing layer.

Via layers such as via layers 152 may be interposed between each adjacent pair of routing layers in the dielectric stack-up. In the example of FIG. 9, a first via layer 152 may be interposed between the M0 metal routing layer and the POLY layer, a second via layer 152 may be interposed between the POLY layer and the M1 metal routing layer, and a third via layer 152 may be interposed between the M1 metal routing layer and the M2 metal routing layer. Conductive via structures (sometimes referred to as through-hole contacts) may be formed through via layers 152 to interconnect different portions of the display pixel structures. The stack-up of FIG. 9 is merely illustrative. In general, the data line, gate line, active material and light shield structures may be formed according to a different combination of conductive layers.

Referring back to FIG. 8, display pixel 52 may include control line 102 and light shield member 112 formed in the M0 metal routing layer, active material 110 formed in the POLY layer, and gate line 46 and gate member 114 formed in the M1 metal routing layer. Transistor T1 is formed at the intersection of gate line 46 and active material 110. The portion of the active region that lies directly beneath gate line 46 serves as the channel region for transistor T1. Light shield member 112 may be an opaque metal structure that is able to prevent backlight from directly impinging the channel region of transistor T1. This helps shield the channel regions from excessive light, which can adversely impact the off-leakage characteristics of thin-film transistors. Light shield member 112 may also be electrically floating (e.g., light shield member 112 is not actively driven by a pull-up or pull-down circuit).

Transistor T2 is formed at the intersection of control line 102 and active material 110. The portion of the active region that lies directly above line 102 serves as the channel region for transistor T2. Gate member 114 may be an electrically floating structure in the M1 layer, but serves as a self-aligning mask for forming lightly-doped drain (LDD) regions in transistor T2. Control line 102 formed in this way also helps to shield the channel of transistor T2 from backlight for improving off-leakage characteristics. Control line 102 may therefore sometimes be referred to as a light shield (LS) line.

Transistor T1 having its channel region formed directly below gate control line 46 may sometimes be referred to as a "top-gate" thin-film transistor. Transistor T2 having its channel region formed directly above control line 102 may sometimes be referred to as a "bottom-gate" thin-film transistor (e.g., the active gate conductor of T2 is actually formed below its channel region). In this example, control line 102 may be formed orthogonally with respect to gate line 46. The second source-drain terminal of transistor T2 may be coupled to a pixel contact structure $CON_{PIX}$, which connects transistor T2 to a storage capacitor (not shown in FIG. 8) which may be formed in higher metal routing layers. The first source-drain terminal of transistor T1 may be coupled to a data line contact structure $CON_{DL}$, which connects transistor T1 to a corresponding data line routing path formed in the M2 metal routing layer (also not shown in FIG. 8).

In some embodiments, the data line routing path may be routed in parallel with and directly over LS routing path 102. Doing so may help improve the aperture ratio of display 10. The aperture ratio (or aperture) may be defined by the amount of backlight that can pass through each display pixel 52. For example, the aperture of a pixel may be defined by the amount of transparent area in a display pixel relative to the amount of opaque area associated with opaque transistor structures, metal lines, etc. In general, displays with overlapping metal paths can help reduce the aperture ratio, thereby improving backlight efficiency.

Figure 10:
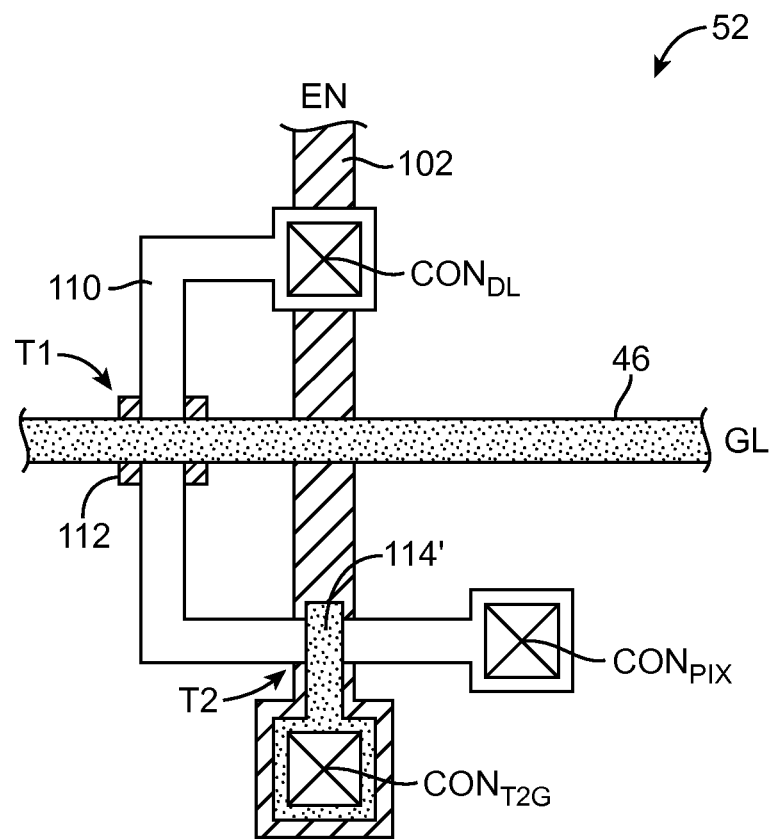
FIG. 10 is a circuit diagram of an illustrative display pixel element having a decoupling top-gate thin-film transistor in accordance with an embodiment of the present invention.

In another suitable arrangement of the present invention, both transistors T1 and T2 of display pixel 52 may be implemented using top-gate TFTs (see, e.g., FIG. 10). As shown in FIG. 10, transistor T1 and transistor T2 are formed using the top-gate TFT arrangement. The formation of transistor T1 in FIG. 10 may be substantially similar to that of pixel 52 shown in FIG. 9. Transistor T2 in FIG. 10 may include an active gate member 114' formed in the M1 metal layer. Gate member 114' may be coupled to LS line 102 through via structure $CON_{T2G}$. Formed in this way, gate member 114' formed above the channel region of transistor T2 controls the operation of transistor T2, whereas LS line 102 formed below the channel region of T2 serves as a light shielding layer to prevent backlight from adversely impacting the performance of transistor T2.

Figure 11:
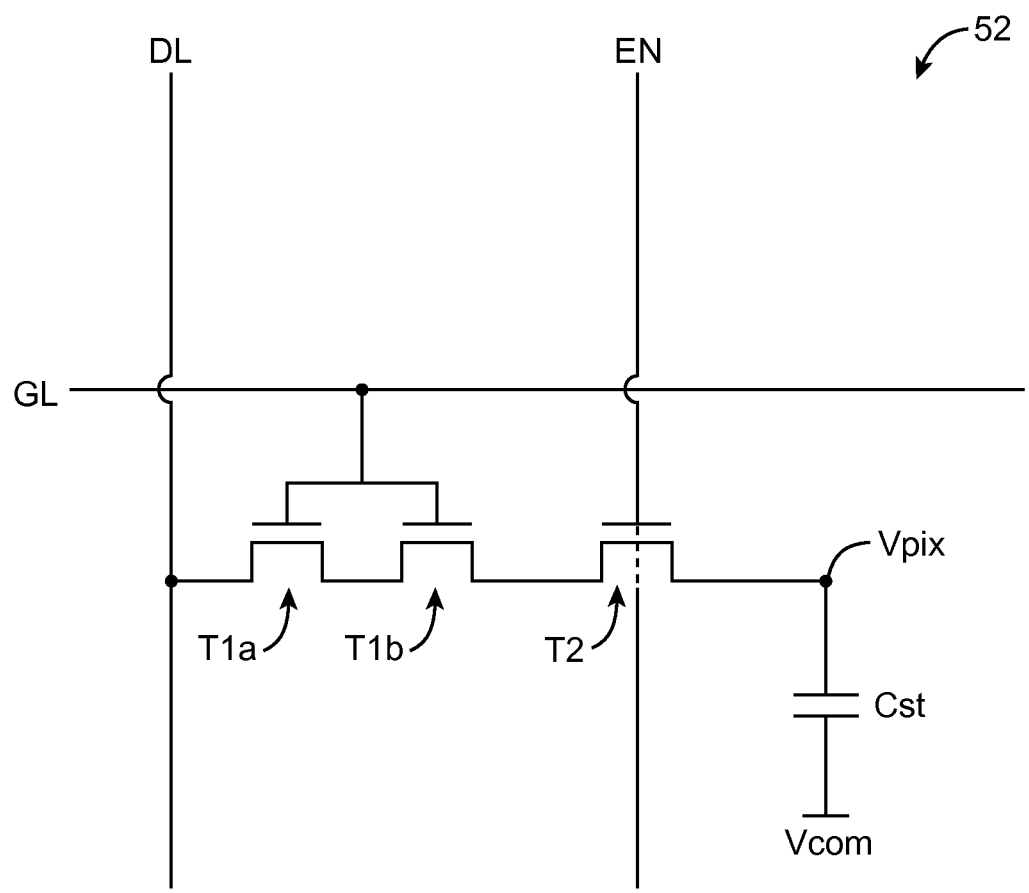
FIG. 11 is a circuit diagram of an illustrative display pixel element having stacked gate line thin-film transistors and a decoupling bottom-gate thin-film transistor in accordance with an embodiment of the present invention.

In yet another suitable arrangement, display pixel 52 may be provided with stacked TFTs to help reduce leakage. FIG. 11 shows an exemplary display pixel 52 having stacked transistors T1a and T1b. As shown in FIG. 11, transistor T1a may have a first source-drain terminal that is coupled to a corresponding data line, a second source-drain terminal, and a gate terminal that is coupled to a corresponding gate line. Transistor T1b may have a first source-drain terminal that is coupled to the second source-drain terminal of T1a, a second source-drain terminal that is coupled to transistor T2, and a gate terminal that is coupled to the same gate line to which transistor T1a is connected (e.g., transistors T1a and T1b have gates that receive the same gate line signal GL). Similar to the previous embodiments, transistor T2 of FIG. 11 is connected to a separate LS line on which enable signal EN is provided. Stacking transistors T1a and T1b in this way can help dramatically reduce leakage currents in pixel 52.

Figure 12:
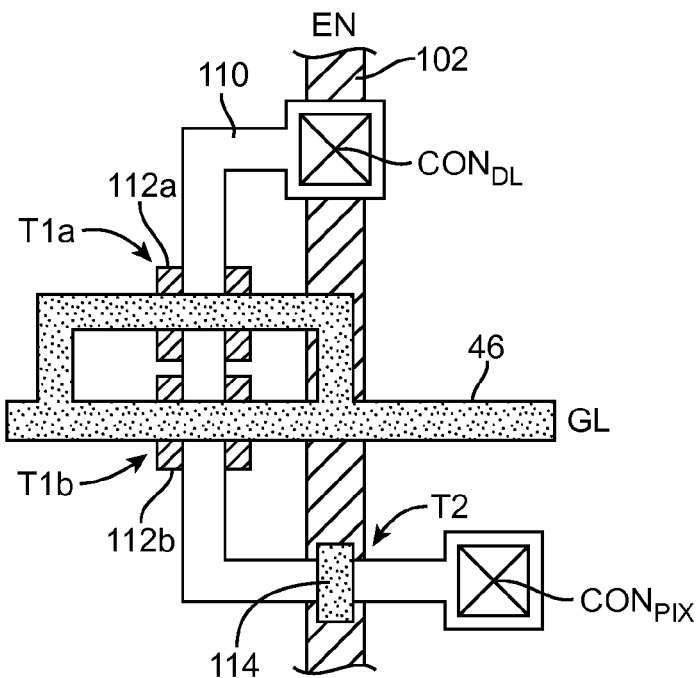
FIG. 12 is a top layout view of the display pixel of FIG. 11 in accordance with an embodiment of the present invention.

FIG. 12 shows one implementation of the display pixel of FIG. 11 in which transistors T1a and T1b are formed using the top-gate TFT configuration and in which transistor T2 is formed using the bottom-gate TFT configuration. As shown in FIG. 12, gate line 46 may be split into first and second segments. Transistor T1a is formed at the intersection of the first gate line segment and active material 110, whereas transistor T1b is formed at the intersection of the second gate line segment and active material 110. Floating light shield members 112a and 112b may be formed directly beneath transistors T1a and T1b, respectively, to provide backlight shielding capabilities. The bottom-gate TFT configuration of T2 in FIG. 12 is similar to that already described in connection with FIG. 8.

Figure 13:
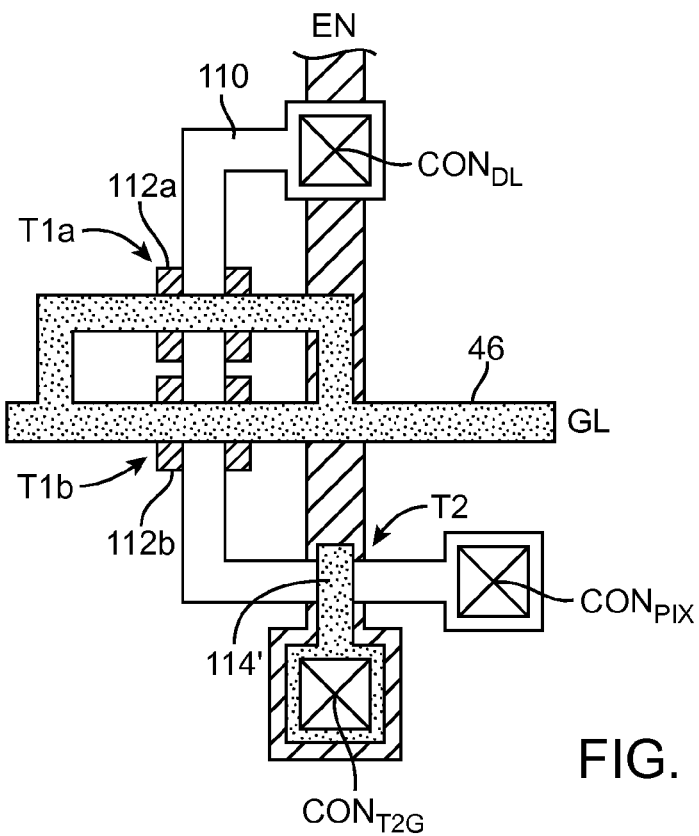
FIG. 13 is a top layout view of a display pixel of the type shown in FIG. 11, where the decoupling transistor is implemented using a top-gate thin-film transistor in accordance with an embodiment of the present invention.

FIG. 13 shows another implementation of the display pixel of FIG. 11 in which transistors T1a and T1b are formed using the top-gate TFT configuration and in which transistor T2 is also formed using the top-gate TFT configuration. As shown in FIG. 13, gate line 46 may be split into first and second branches. Transistor T1a is formed at the intersection of the first gate line branch and active material 110, whereas transistor T1b is formed at the intersection of the second gate line branch and active material 110. Floating light shield members 112a and 112b may be formed directly beneath transistors T1a and T1b, respectively, to provide backlight shielding capabilities. The top-gate TFT configuration of T2 in FIG. 13 is similar to that already described in connection with FIG. 10.

As described above, LS lines 102 may be routed in parallel and in close proximity to the data lines. When two conductive paths are routed in close proximity to one another, a substantial amount of parasitic capacitive may be present between the two conductive paths. When the data line signals change values, the value of EN on lines 102 may be temporarily affected due to the capacitive coupling. When writing new data values into each of the selected display pixels, a substantial amount of power may be consumed to charge the parasitic capacitance on the LS lines 102. This can slow down the speed at which date signals are written into the display pixels, which degrades display performance.

Figure 14:
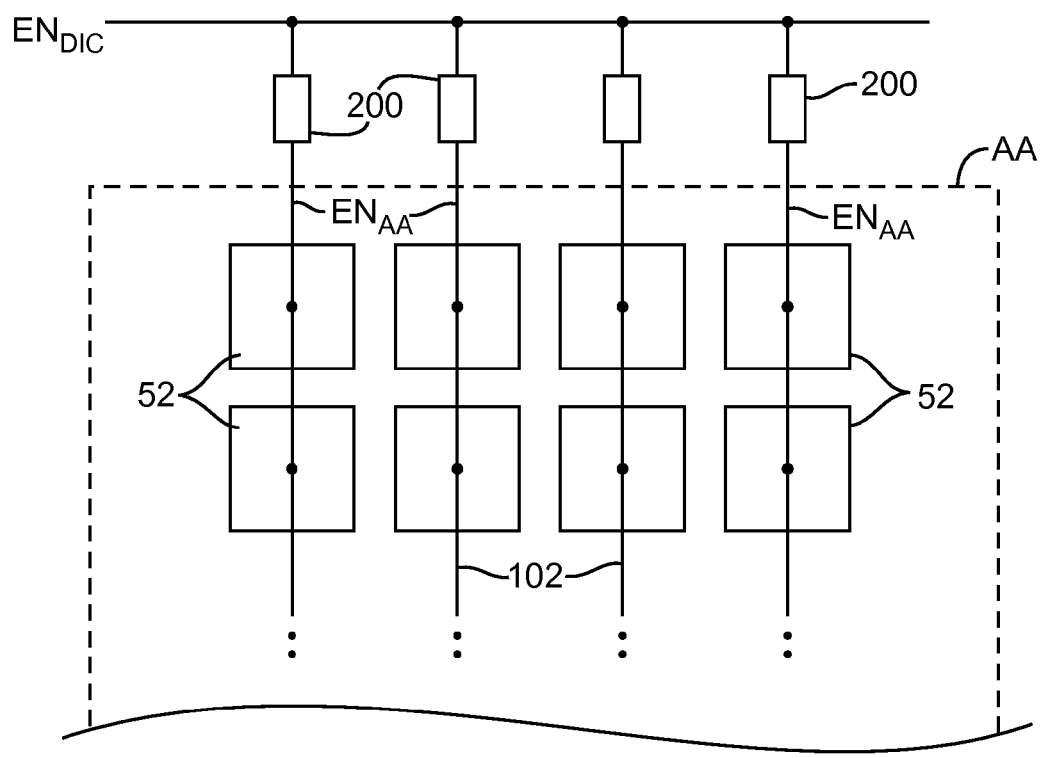
FIG. 14 is a diagram showing additional loading components that can be interposed in light shield lines to reduce power consumption in accordance with an embodiment of the present invention.

In an effort to reduce the power required to charge the LS line capacitance, additional loading circuits may be interposed in the LS lines 102 (see, e.g., FIG. 14). As shown in FIG. 14, the display driver integrated circuit may output a global enable signal $EN_{DIC}$, which is then fed to respective columns of display pixels 52 via loading circuits 200 to generated signal $EN_{AA}$, which can then be fed to display pixels 52 in an active area AA of the display. The active area AA may be, for example, a rectangular region in the center of display 10 in which display pixels are actively used to display images for a user of device 6 (FIG. 1).

Figure 15:
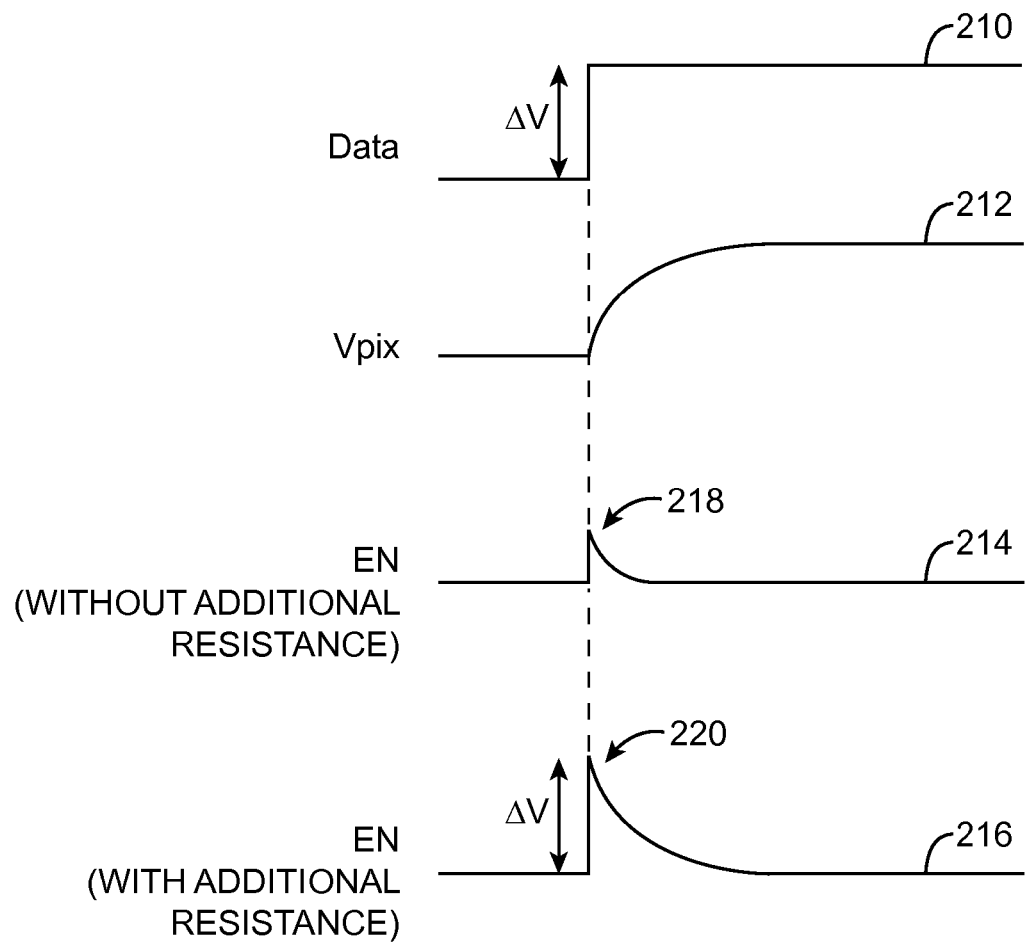
FIG. 15 is a diagram illustrating how the use of the additional loading components of FIG. 14 helps reduce power consumption in accordance with an embodiment of the present invention.

The addition of loading circuits in LS lines 102 reduces the ability with which the LS lines respond to instantaneous changes in the data line voltages. FIG. 15 shows exemplary waveforms illustrating how the use of loading circuits 200 helps to reduce power consumption. Waveform 210 may represent the data line voltage. Waveform 212 may represent the pixel electrode voltage Vpix. Waveform 214 may represent the voltage response when circuits 200 are absent, whereas waveform 216 may represent the voltage response when circuits 200 are present.

As shown in FIG. 15, the data line voltage may be adjusted by ΔV to write a new value into a display pixel. During data loading operations, the associated thin-film transistors (e.g., transistors T1 and T2 in FIGS. 6, 8, 10, and 11-13) may be turned on to pass the data line voltage to the pixel storage node. As a result, Vpix waveform 212 should track the behavior of waveform 210.

Waveform 214 illustrates the behavior of the LS line if circuits 200 are not used. The voltage change ΔV in the data line will only result in a relatively small perturbation 218 in signal EN. As a result, a substantial amount of current from the display driver will still have to be expended to charge the remaining voltage difference between the data line and the LS line.

Waveform 216 illustrates the behavior of the LS line when circuits 200 are used. Circuits 200 present additional resistance on the LS line, which increases the RC coupling effect between the data line and the LS line. As a result, a voltage change ΔV in the data line will result in a substantially similar voltage perturbation of ΔV in signal EN. In this way, the instantaneous voltage difference between the data line and the LS line is decreased, which reduces the need for display driver to charge up the LS capacitance. The use of additional loading circuits 200 can therefore help to substantially reduce power consumption and improve display performance.

Figure 16A:
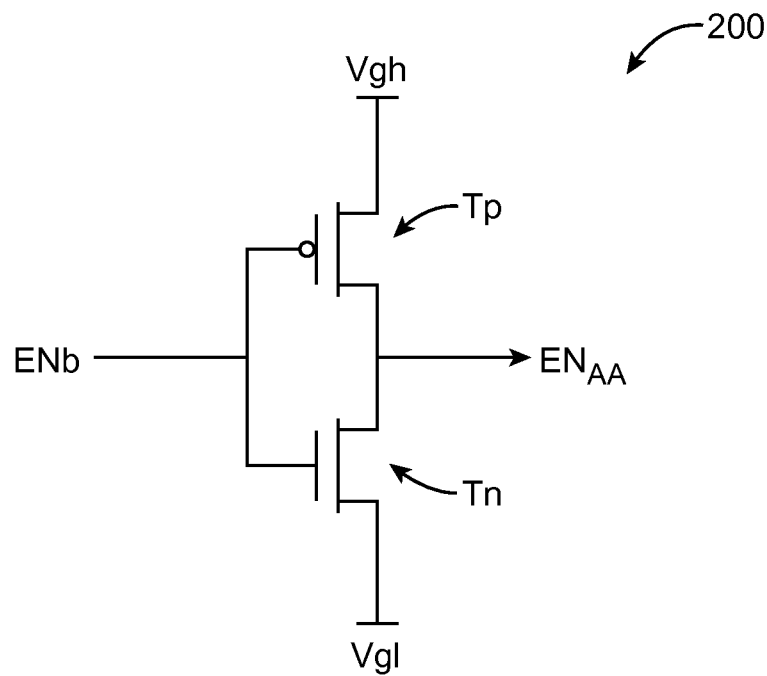
FIGS. 16A and 16B show two different possible implementations of the additional loading components in accordance with an embodiment of the present invention.

FIG. 16A shows one suitable configuration of circuit 200. As shown in FIG. 16A, circuit 200 may be an inverting circuit that includes a p-channel transistor Tp and an n-channel transistor Tn coupled in series between a first power supply line (e.g., a power supply line on which positive power supply signal Vgh is provided) and a second power supply line (e.g., a power supply line on which ground power supply signal Vgl is provided). Transistors Tp and Tn may be thin-film transistors formed in TFT layer 14 (FIG. 2). The inverting circuit may have an input that receives an active low signal ENb from the display driver and an output on which enable signal $EN_{AA}$ is provided to the display pixel structures in the active area of display 10.

Figure 16B:
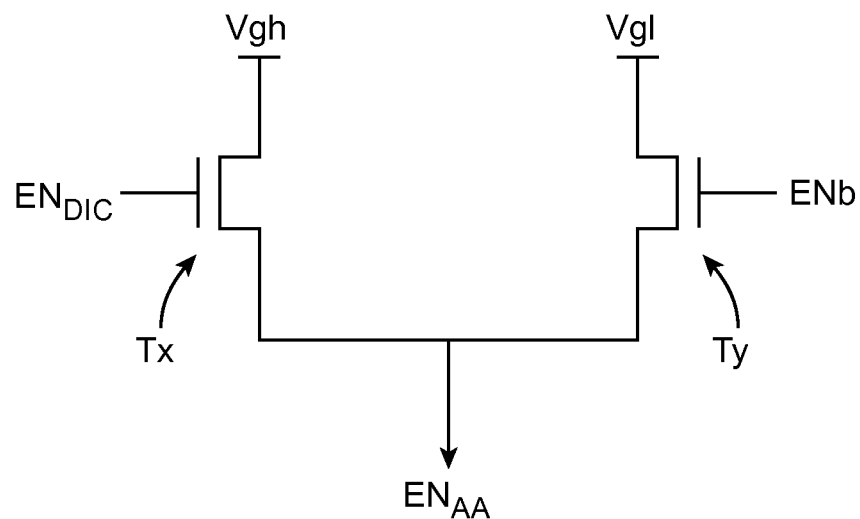

FIG. 16B shows another suitable configuration of circuit 200. As shown in FIG. 16B, circuit 200 may be include a first pass transistor Tx and a second pass transistor Ty. Transistor Tx may have a gate that receives control signal $EN_{DIC}$ from the display driver IC, whereas transistor Ty may have a gate that receives an inverted version of signal $EN_{DIC}$ (e.g., ENb) from the display driver. When signal $EN_{DIC}$ is asserted, transistor Tx is activated to pass positive power supply voltage Vgh to the output of circuit 200 while transistor Ty is switched out of use. When signal $EN_{DIC}$ is deasserted, signal ENb is asserted to turn on transistor Ty to pass ground power supply voltage Vgl to the output of circuit 200 while transistor Tx is turned off. Output signal $EN_{AA}$ generated in this way may be provided to the display pixel structures in the active area of display 10 via respective LS control lines 102 (FIG. 14). Circuit 200 formed using active circuitry such as transistors can sometimes be referred to as an active load circuit.

Figure 17:
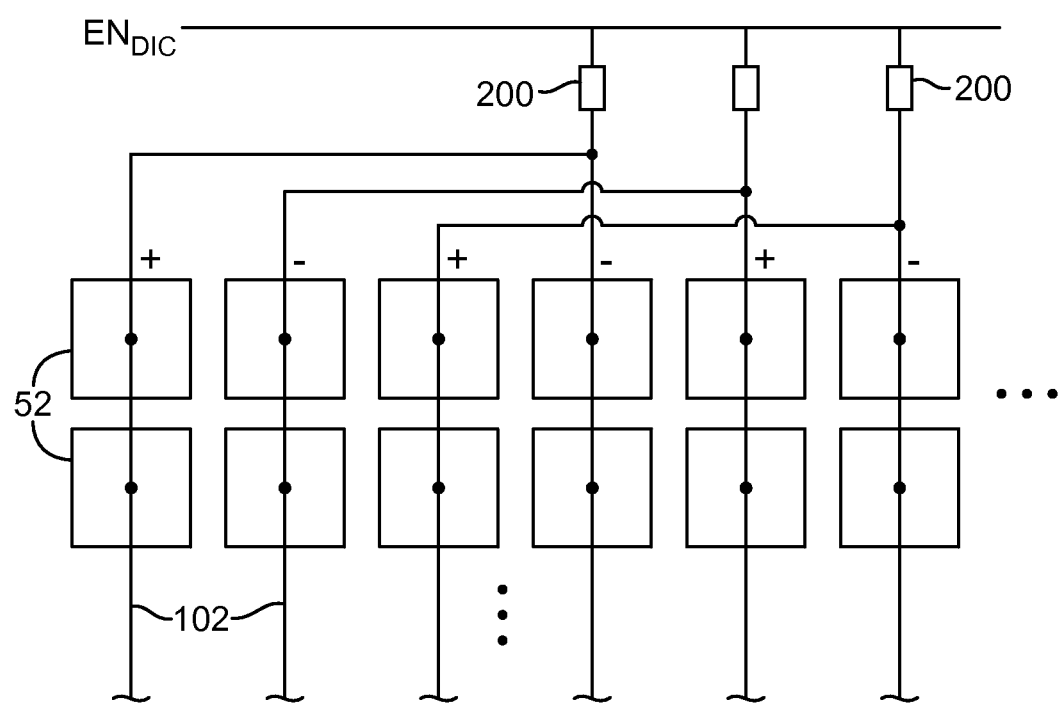
FIG. 17 is a diagram showing how adjacent sub-pixels of the same color may be routed to a common light shield line loading component in accordance with an embodiment of the present invention.

In other suitable arrangements, adjacent subpixels of the same color (e.g., pixels 52 arranged along the same column) may have their LS lines 102 shorted before being coupled to the display driver via a corresponding resistive circuit 200 (see, e.g., FIG. 17). Doing so may be advantageous in the case of column inversion driving, since the polarity of the perturbation for adjacent subpixels of the same color are in opposite directions. As a result, any capacitive voltage coupling can be effectively canceled out.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device display pixel, comprising:
a data line;
a pixel storage node;
a gate line on which a gate line signal is provided;
an enable line on which an enable signal that is different than the gate line signal is provided, wherein the enable signal is asserted throughout a display interval and wherein the enable signal is deasserted during a touch interval that immediately follows the display interval and that indicates when a touch sensor is activated, and wherein the data line is parallel with the enable line in a region in which the enable line overlaps the data line; and
first and second transistors coupled in series between and coupled to the data line and the pixel storage node, wherein the first transistor has a gate terminal that receives the gate line signal from the gate line, and wherein the second transistor has a gate terminal that receives the enable signal from the enable line.

2. The electronic device display pixel defined in claim 1, wherein at least one of the first and second transistors comprises a bottom-gate thin-film transistor.

3. The electronic device display pixel defined in claim 1, wherein the first transistor comprises a top-gate thin-film transistor, and wherein the second transistor comprises a bottom-gate thin-film transistor.

4. The electronic device display pixel defined in claim 1, wherein the first and second transistors comprise top-gate thin-film transistors.

5. The electronic device display pixel defined in claim 1, further comprising:
a third transistor stacked in series with the first transistor, wherein the third transistor has a gate that receives the gate line signal from the gate line.

6. The electronic device display pixel defined in claim 5, wherein the third transistor comprises a top-gate thin-film transistor.

7. The electronic device display pixel defined in claim 1, further comprising:
a common electrode; and
a storage capacitor having a first terminal that is coupled to the pixel storage node and a second terminal that is coupled to the common electrode.

8. The electronic device display pixel defined in claim 1, wherein the gate and enable lines are formed in different thin-film transistor dielectric layers.

9. The electronic device display pixel defined in claim 1, wherein the data line is parallel to the second control line and is formed over the second control line.

10. An electronic device display pixel, comprising:
a data line;
a pixel storage node;
a gate line on which a gate line signal is provided;
an enable line on which an enable signal that is different than the gate line signal is provided, wherein the enable signal is asserted throughout a display interval and wherein the enable signal is deasserted during a touch interval that immediately follows the display interval and that indicates when a touch sensor is activated;
first and second transistors coupled in series between and coupled to the data line and the pixel storage node, wherein the first transistor has a gate terminal that receives the gate line signal from the gate line, and wherein the second transistor has a gate terminal that receives the enable signal from the enable line; and
an electrically floating light shield structure formed below the first transistor.

11. The electronic device display pixel defined in claim 10, further comprising:
an electrically floating conductive member formed above the second transistor.

12. An electronic device display, comprising:
a control line on which a control signal is provided; and
a plurality of display pixels arranged in rows and columns, wherein each of the display pixels includes first and second transistors coupled in series, wherein the second transistor in each display pixel in a first column of the display pixels has a gate terminal that receives the control signal via a first loading circuit, wherein the second transistor in each display pixel in a second column of the display pixels has a gate terminal receives the control signal via a second loading circuit, and wherein the first and second loading circuits each comprise a first pass transistor that passes a positive power supply voltage and a second pass transistor that passes a ground power supply voltage.

13. The electronic device display defined in claim 12, wherein the first and second pass transistors in each of the first and second loading circuits form an inverting circuit.

14. The electronic device display defined in claim 12, wherein the second transistor in each display pixel in a third column of the display pixels has a gate terminal that receives the control signal via the first loading circuit.

15. The electronic device display defined in claim 12, further comprising:
   a gate line on which a gate line signal is provided, wherein the first transistor in at least one display pixel in the first column of the display pixels receives the gate line signal from the gate line, wherein the first transistor in at least one display pixel in the second column of the display pixels receives the gate line signal from the gate line, and wherein the gate line is orthogonal to the control line.

\* \* \* \* \*